(12) United States Patent
Walker

(10) Patent No.: US 8,154,898 B2
(45) Date of Patent: Apr. 10, 2012

(54) CURRENT DRIVEN BIPOLAR HIGH VOLTAGE DRIVER FOR CAPACITIVE LOADS

(75) Inventor: James T. Walker, Palo Alto, CA (US)

(73) Assignee: Supertex, Inc., Sunnyvale, CA (US)

( * ) Notice: Subject to any disclaimer, the term of this patent is extended or adjusted under 35 U.S.C. 154(b) by 176 days.

(21) Appl. No.: 11/762,901

(22) Filed: Jun. 14, 2007

(65) Prior Publication Data

US 2007/0296348 A1   Dec. 27, 2007

Related U.S. Application Data

(60) Provisional application No. 60/804,916, filed on Jun. 15, 2006.

(51) Int. Cl.
*H02M 7/5387* (2007.01)
*H02M 3/18* (2006.01)

(52) U.S. Cl. ......... 363/132; 363/60; 363/98; 315/169.3; 327/536

(58) Field of Classification Search ............ 363/59, 363/132, 98, 60; 315/169.3; 327/536
See application file for complete search history.

(56) References Cited

U.S. PATENT DOCUMENTS

| | | | | |
|---|---|---|---|---|
| 5,323,305 A * | 6/1994 | Ikeda et al. | ................ | 363/98 |
| 5,349,269 A * | 9/1994 | Kimball | ................ | 315/169.3 |
| 5,493,183 A * | 2/1996 | Kimball | ................ | 315/308 |
| 5,566,064 A * | 10/1996 | Schoenwald et al. | ........ | 363/132 |
| 5,780,975 A * | 7/1998 | Krafcik | ................ | 315/169.3 |
| 6,278,423 B1 * | 8/2001 | Wald et al. | ................ | 345/76 |
| 6,282,111 B1 * | 8/2001 | Illingworth | ................ | 363/98 |
| 6,462,485 B1 * | 10/2002 | Kimball | ................ | 315/169.3 |
| 6,710,773 B2 * | 3/2004 | Jenkins et al. | ........... | 315/169.3 |
| 2005/0073829 A1 * | 4/2005 | Burger et al. | ............ | 362/84 |
| 2005/0258773 A1 * | 11/2005 | Vahabzadeh et al. | ..... | 315/169.3 |

* cited by examiner

*Primary Examiner* — Adolf Berhane
*Assistant Examiner* — Fred E Finch, III
(74) *Attorney, Agent, or Firm* — Jeffrey D. Moy; Weiss & Moy, P.C.

(57) ABSTRACT

A circuit for generating a high voltage alternating current to drive a load has a current source having a first terminal and a second terminal. The circuit further has an output terminal and a circuit ground terminal. A first switch will conduct between the first terminal of the current source and the circuit ground terminal when the first switch is closed. A second switch will conduct between the first terminal of the current source and the output terminal when the second switch is closed. A third switch will conduct between the second terminal of the current source and the circuit ground terminal when the third switch is closed. A fourth switch will conduct between the second terminal of the current source and the output terminal when the fourth switch is closed. A load is coupled to the output terminal and the circuit ground terminal.

19 Claims, 3 Drawing Sheets

CURRENT DRIVEN BIPOLAR HIGH VOLTAGE DRIVER FOR CAPACITIVE LOADS

RELATED APPLICATION

This application is related to U.S. Provisional Application Ser. No. 60/804,916, filed Jun. 15, 2006, in the name of the same inventor listed above, and entitled, "A CURRENT DRIVEN BIPOLAR HIGH VOLTAGE DRIVER FOR CAPACITIVE LOADS". The present patent application claims the benefit under 35 U.S.C. §119(e).

FIELD OF THE INVENTION

This invention relates to electroluminescent lamps and, more specifically, to a circuit which will accept a low DC voltage and output a high AC voltage to operate the electroluminescent lamp.

BACKGROUND OF THE INVENTION

An electroluminescent (EL) lamp is commonly used as a means for backlighting different portable electronic devices. EL lamps are commonly used in mobile phones, PDAs, MP3 players, and the like to provide backlighting so the user can identify different operating components. EL lamps are basically capacitors that contain a phosphor so that a light is given off when a displacement current flows. Because of this, the light output of a particular lamp is to a first order directly dependent on the product of the operating voltage and frequency, and to a lesser extent on the waveshape being used to drive the lamp.

The EL lamps flexibility and thinness allows the EL lamp to be placed just underneath the keypad or operating components of the device. The EL lamp's light uniformity eliminates the need for a light diffuser. The uniform light provides the device with a more pleasing appearance. The construction of the lighted device can therefore be made very thin.

In some systems using electroluminescent lamps, it is desirable to have a circuit which will accept a low DC voltage and output a high AC voltage to operate the lamp. In addition, it is useful to have a circuit which allows one terminal of the lamp to be connected to circuit ground. This facilitates use of multiple lamps on a common substrate, as they may have a common backing electrode. This will further reduce the number of connections required by almost a factor of two.

Therefore, a need existed to provide a device and method that provides the above features.

SUMMARY OF THE INVENTION

A circuit for generating a high voltage alternating current to drive a load has a current source having a first terminal and a second terminal. The circuit further has an output terminal and a circuit ground terminal. A first switch will conduct between the first terminal of the current source and the circuit ground terminal when the first switch is closed. A second switch will conduct between the first terminal of the current source and the output terminal when the second switch is closed. A third switch will conduct between the second terminal of the current source and the circuit ground terminal when the third switch is closed. A fourth switch will conduct between the second terminal of the current source and the output terminal when the fourth switch is closed. A load is coupled to the output terminal and the circuit ground terminal.

A circuit for generating a high voltage alternating current to drive a load has a current source having a first terminal and a second terminal. The circuit has an output terminal and a circuit ground terminal. A first switch is provided and will conduct between the first terminal of the current source and the circuit ground terminal when the first switch is closed. A second switch is provided and will conduct between the first terminal of the current source and the output terminal when the second switch is closed. A third switch is provided and will conduct between the second terminal of the current source and the circuit ground terminal when the third switch is closed. A fourth switch is provided and will conduct between the second terminal of the current source and the output terminal when the fourth switch is closed. A load is coupled to the output terminal and the circuit ground terminal. The first switch, the second switch, the third switch, and the fourth switch will open and close to alternately connect the current source in series with the load with one of two polarities. The second switch and the third switch will close to charge the load in a first polarity. The first switch and the fourth switch will close to charge the load in a second polarity.

The present invention is best understood by reference to the following detailed description when read in conjunction with the accompanying drawings.

DETAILED DESCRIPTION

Figure 1:
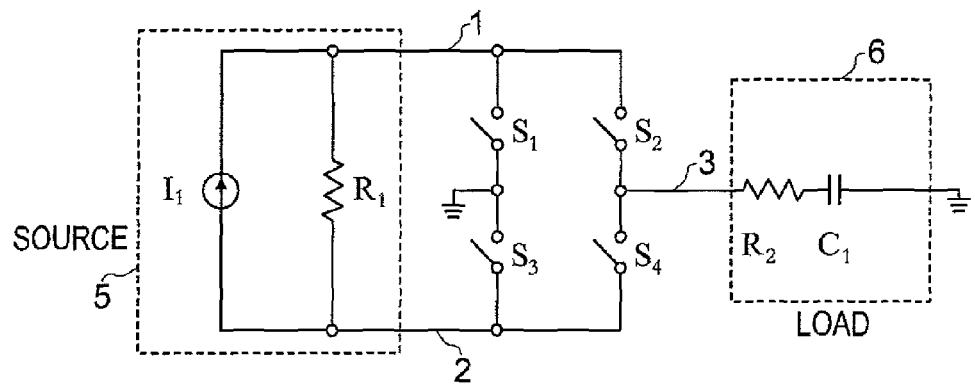
FIG. 1 is a simplified function block diagram of a circuit using a current source for driving a capacitive load.

Referring FIG. 1, a circuit 100 using a current source I1 to drive a capacitive load C1 is shown. The circuit will allow the load 102 to have one terminal returned to the circuit ground (GND). This is convenient for systems in which there are several loads in use, with a common terminal connected to all loads. The resistance R1 represents the output impedance of the current source I1, and will limit the ultimate voltage which is developed across the current source if there is no other load across it. This resistance R1, although shown as a linear resistor, may be a non-linear resistance, semiconductor, or other combination of circuit elements. The listing of the above is given as an example and should not be seen in a limiting scope. The capacitive load C1 is shown as having an internal series resistance R2, which may be either linear or non-linear in characteristic. For this simplified discussion, R2 may also include parasitic resistance present in the switches S1 through S4. Practical loads such as an electroluminescent lamp may have a more complicated model circuit, such that the model shown is a simplification. The combination of I1 and R1 is the source 5 of the energy in the circuit 100, and the combination of R2 and C2 is the load 6 for energy transfer in the circuit 100.

The bridge configuration of the set of switches S1, S2, S3, and S4 is used to allow alternately connecting the source 5 in series with the load 6 with either of two polarities. If S2 and S3 are closed, then node 2 is connected to circuit ground, and nodes 1, 3, and 4 will charge in a positive direction. Alternately, if S1 and S4 are closed, then node 1 is connected to ground, and nodes 2, 3, and 4 will charge in a negative direction. In this way, node 4 may be made to assume both positive and negative voltages at will. Assume for simplicity that the resistances R1 and R2 are linear. The maximum voltage magnitude developed in either polarity case will be the product of I1 and R1, with a charging time constant for the voltage at node 4 of $\tau 1=(R1+R2)*C1$.

The switches S1, S2, S3, and S4 may also be operated so as to discharge the load capacitance C1 to a final value near zero volts. This is done by closing both S1 and S2 simultaneously, or S3 and S4 simultaneously. If additional switches are closed at the same time, it will have no effect on the discharging function, but may affect the voltage developed across the source 5. During the discharge time with S1 and S2 closed, for example, current will flow from the capacitor C1 to ground through R2. The discharge will occur with a time constant of $\tau 2=R2*C2$. Since R2 is typically much smaller than R1, the discharge will be quicker than the charge time.

Figure 2:
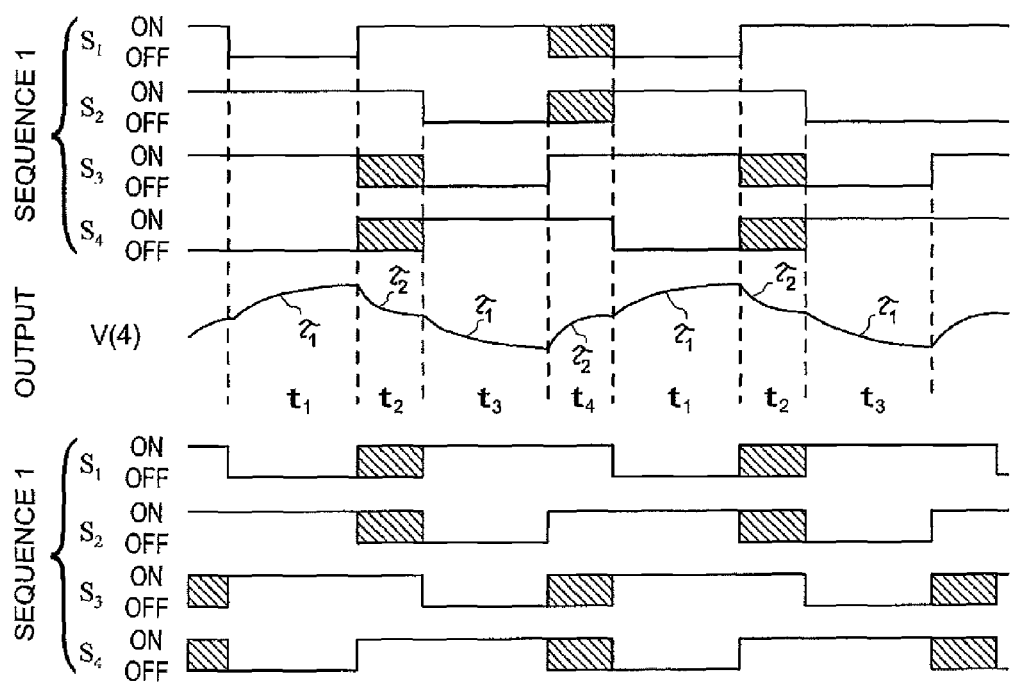
FIG. 2 shows different sequences of switch operation which may be used to produce a desired waveform.

Referring to FIG. 2, two different sequences of switch operation which may be used to produce the same waveform V(4) as shown. These sequences of switch operation alternately connect the source 5 in either of two directions in series with the load 6. The net result is an alternating voltage present at the node 4, shown as V(4) in FIG. 2. The cross-hatched portions of the waveforms are regions in time where the choice of switch operation may be altered without affecting the resulting waveform.

During the first time period t1, switches S2 and S3 are On, with the switches S1 and S4 are Off, so that the load capacitance C1 is charged in a positive direction, with a charging time constant $\tau 1$ as discussed above. After node 4 has reached the desired positive voltage, time period t2 is started to discharge the load capacitance. During the second time period t2, switch S1 is also turned On to discharge the load capacitor C1 towards zero voltage. The node 4 voltage then discharges with a time constant $\tau 2$ to near zero volts.

At the end of time period t2, switches S2 and S3 turned Off, and switch S4 is turned On. Now the load capacitance C1 is charged in a negative direction, with a charging time constant of $\tau 1$ as discussed before. After the voltage on node 4 has reached the desired negative voltage, time period t4 is started to once again discharge the load capacitance C1. The node 4 voltage then discharges with a time constant $\tau 2$ to near zero volts as before.

The entire cycle, as discussed above, repeats at a period rate, typically 100 to 500 Hz, to generate an AC voltage across the load capacitance C1. This AC voltage causes the phosphor in the electroluminescent lamp to emit light.

In FIG. 2, the first sequence (Sequence 1) shows one set of times when switch closures are optional, and the second sequence (Sequence 2) shows another set of times when switch closures are optional. Either Sequence 1 or 2 may be used to provide the AC waveform given. There are many other switch sequences which may be used with the circuit 100 to achieve equivalent results. More complex sequences may also be used to produce waveforms across the load 6 with additional desirable properties as known in the state of the art without altering the basic functional configuration benefits of using a current source I1 as the main power source to generate an AC voltage across the load C1.

Figure 3:
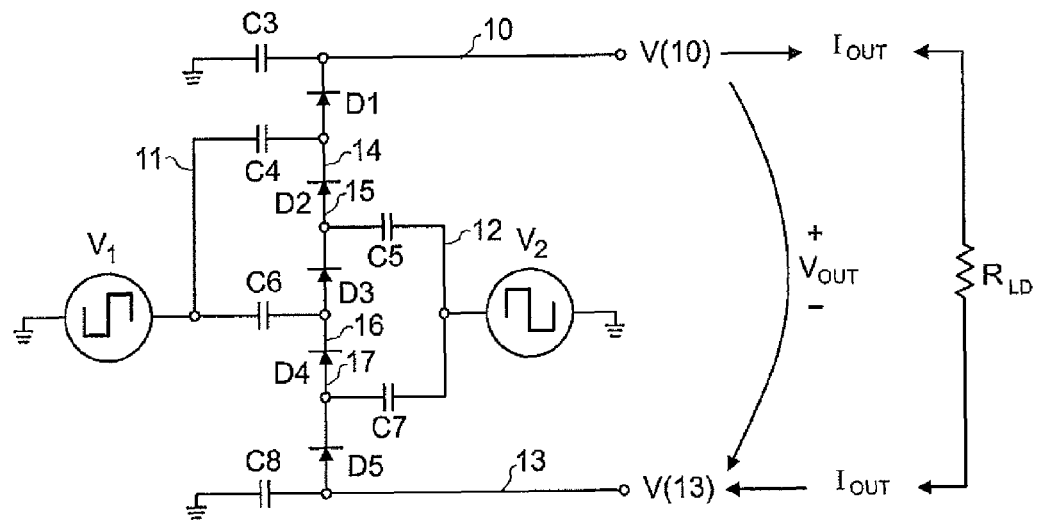
FIG. 3 is a simplified function block diagram of a capacitive charge pump.

Referring to FIG. 3, a capacitive charge pump 200 is shown. The charge pump 200 consists of a series of diodes, herein marked D1 through D5, together with a set of capacitors C3 through C8. The two voltage sources V1 and V2 are nominally square wave voltage sources, with phases 180 degrees apart for best operation. As a result, when V1 is positive, V2 is negative. The amplitudes of V1 and V2 do not have to be identical, and for some cases one of them may be zero. Ideal operation occurs when V1 and V2 have equal amplitudes and opposite phases. The diodes conduct alternately, so that charge is conducted from node 13 through the diodes to node 10. The difference between V(10) and V(13) is denoted as Vout, and the current flowing through the load is denoted as Iout. For the case shown here with a resistive load Rld, Vout=Iout*Rld.

The charge pump 200 may have an arbitrary number of stages, depending on the input and output voltages which are desired. One stage of the charge pump 200 in FIG. 3 could be construed to consist of D1, C4, D2, and C5. A second stage would be D3, C6, D4, and C7. Each stage as listed will produce an incremental DC output voltage equal to two times the peak-to-peak drive voltage applied. The number of stages may be changed at will, with proper attention given to the parasitic capacitances and resistances not represented here. The diode D5 at the end serves the purpose of rectification of the half cycles when node 17 is lower than node 13 for current conduction purposes. Capacitors C3 and C8 serve as bypass capacitors to reduce the voltage ripple which may be present across the load $R_{LD}$, and may be chosen as desired for that purpose. For some applications, the number of stages may easily exceed 20 or more, so that drive waveforms of 3 to 6 volts amplitude may produce an output open circuit voltage in excess of 100 volts. The capacitors C3 through C7 will have important parasitic capacitances to the substrate on which they are fabricated if in a semiconductor process, so the physical circuit layout must be done to minimize the parasitic effects. Parasitic capacitance and carrier conduction effects in the diodes are minimized by using diodes fabricated in polysilicon on an insulating layer.

The output voltage $V_{OUT}$ of the charge pump 200 of FIG. 3 is a function of the load current, diode properties, capacitor values, drive voltage, and drive frequency. If one considers a case where all the above properties are held constant except for the load current $I_{OUT}$ and operating frequency, the idealized plots of FIG. 4 result. The charge pump output voltage $V_{OUT}$ decreases in an approximately linear fashion as the load current $I_{OUT}$ increases, dropping eventually to a zero value. For an operating frequency of F3, the no-load output voltage is VM, and the maximum output current is IF3. In a similar manner, other maximum currents occur for different frequencies. In the idealized example shown here, F3>F2>F1.

Figure 4:
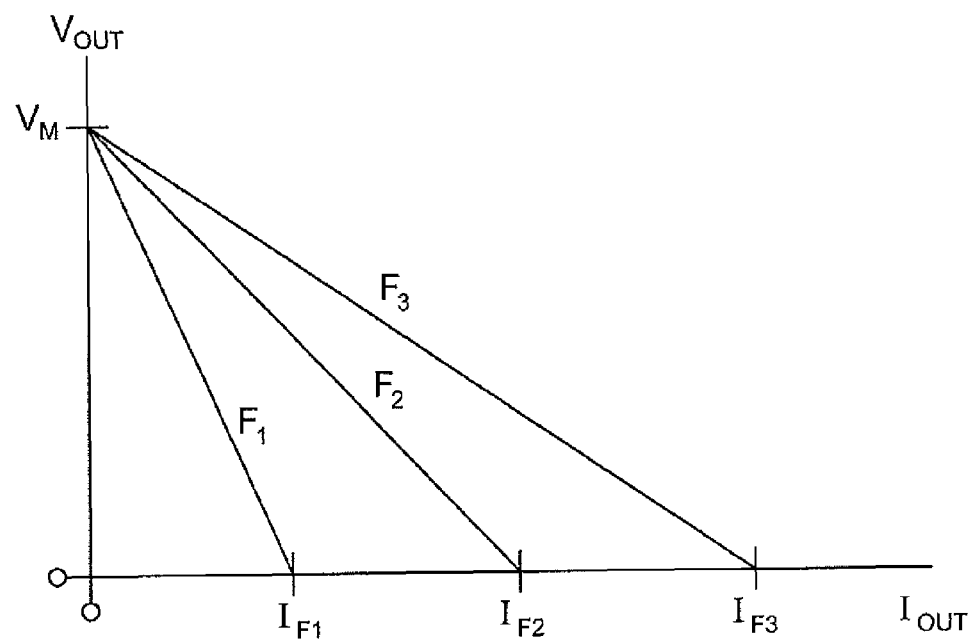
FIG. 4 is a voltage/current diagram depicting the charge pump characteristics.

For all of the cases in FIG. 4, the output impedance of the charge pump may be modeled as RP=VM divided by IF(i). Thus we see that if a charge pump is used for the source 5 of FIG. 1, I1 would be IF3 for operation at frequency F3, and R1 would be the value of RP as calculated above. The rate of charging the capacitance C1 in FIG. 1 would be set by the pump drive frequency (F3 in this case), and the final voltage achieved if there were no other influences would be the voltage VM set by the input drive voltage amplitude and number of pump stages. Because of the effective output resistance R1 for the charge pump current source, the load capacitance C2 in FIG. 1 would charge with a time constant of $\tau 1=(R1+R2)*C1$ as given before. Active circuitry as known in the state of the art could be used to control the drive frequency in order to limit the output voltage at a desired value.

Figure 5:
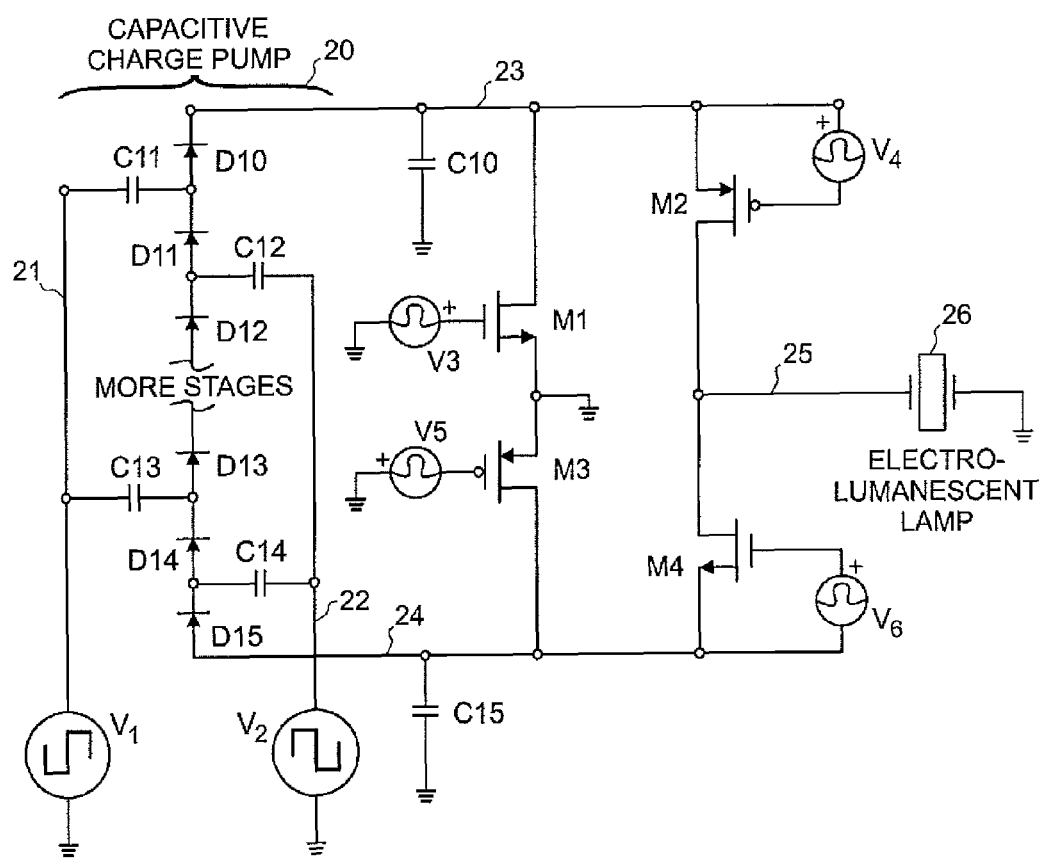
FIG. 5 is a simplified function block diagram of a circuit using a capacitive charge pump to drive a load.

Referring to FIG. 5, an electroluminescent lamp driver 300 using a capacitive charge pump as the current source is shown. The current source I1 and shunt resistor R1 of FIG. 1 are replaced with a capacitive charge pump 20 as shown in FIG. 3. The charge pump 20 may have more stages than shown in the FIG. 5 so that the charge pump 20 may develop the desired high voltage. The drive voltages V1 and V2 come from low voltage CMOS logic circuits as known in the state of the art, and provide enough output current to give adequate voltage excursions for proper pump operation on nodes 21 and 22. The lamp driver 300 may have capacitors C10 and C15. The capacitors C10 and C15 are used to reduce the ripple at the pump frequency occurring on the high voltage nodes 23 and 24. Switches S1 through S4 are replaced with correspondingly numbered MOSFET devices labeled M1 through M4. Digital control signals V3 through V6 are provided for each of the switch transistors M1 through M4. These control signals are generated by means known in the state of the art to cause the transistors M1 through M4 to turn On and Off according to the switching chart shown in FIG. 2, using any acceptable sequence. Variation of the switch timing may be used to achieve a desired wave shape at the electroluminescent lamp terminals.

The lamp driver 300 in FIG. 5 will generate the waveform V(4) shown in FIG. 2 at the node 25. Effectively, the current generated by the capacitive charge pump 20 will be charging the electroluminescent lamp 26 in both positive and negative directions, producing an AC waveform with rounded edges. The rounded edges will act to reduce acoustic noise generated by the lamp displacement currents. In addition, the discharge times denoted as t2 and t4 in FIG. 2 act to remove charge from the lamp without requiring energy from the charge pump. This increases the effective efficiency of the system by a substantial amount. During the discharge time, the waveform rounding is produced by the effective series resistance R2 (FIG. 1), which is a combination of the internal resistance of the electroluminescent lamp 26 and the MOSFET devices M1 through M4 used for the switches. In addition, the MOSFET devices M1 through M4 have internal parasitic diodes between their source and drain junctions, so that when a device drain is biased opposite to that for normal controlled conduction and blocking operation, the parasitic diode conducts. This aids the discharge operation when M1 or M3 turn on, as the parasitic diode in M2 or M4 is capable of conducting the discharge current with less voltage drop than the MOSFET.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A circuit for generating a high voltage alternating current to drive a load comprising:
    a charge pump having a first terminal and a second terminal;
    an output terminal;
    a circuit ground terminal;
    a pair of output capacitive elements attached to the charge pump and the circuit ground terminal to reduce frequency fluctuations, wherein a first output capacitive element is attached to the first terminal of the charge pump and to the circuit ground terminal and a second output capacitive element is attached to the second terminal of the charge pump and to the circuit ground terminal;
    a first switch wherein a first switch first terminal is connected to the first terminal of the charge pump and the first output capacitive element, a first switch second terminal is attached to the circuit ground terminal, the first switch conducting between the first terminal of the charge pump and the circuit ground terminal when the first switch is closed;
    a second switch wherein a second switch first terminal is connected to the first terminal of the charge pump and the first output capacitive element, a second switch second terminal is attached to the load terminal, the second switch conducting between the first terminal of the charge pump and the output terminal when the second switch is closed;
    a third switch wherein a third switch first terminal is connected to the circuit ground terminal and a third switch second terminal is attached to the second terminal of the charge pump and the second output capacitive element, the third switch conducting between the second terminal of the charge pump and the circuit ground terminal when the third switch is closed;
    a fourth switch wherein a fourth switch first terminal is connected to the load terminal and a fourth switch second terminal is attached to the second terminal of the charge pump and the second output capacitive element, the fourth switch conducting between the second terminal of the charge pump and the output terminal when the fourth switch is closed; and
    a load coupled to the output terminal and the circuit ground terminal;
    wherein both the first terminal and the second terminal of the charge pump float to interchange which of the first terminal and the second terminal of the charge pump is grounded to the load;
    wherein the charge pump is a capacitive charge pump providing an approximately constant current output across variable load voltages;
    wherein a minimum terminal count of the circuit is 3.

2. A circuit for generating a high voltage alternating current to drive a load in accordance with claim 1 wherein the load is an electroluminescent lamp, wherein an electroluminescent first terminal is attached to the output terminal and an electroluminescent second terminal is attached to the circuit ground terminal.

3. A circuit for generating a high voltage alternating current to drive a load in accordance with claim 1,
    wherein the first switch is a first transistor having a first transistor first terminal connected to the first terminal of the current source, a first transistor second terminal attached to the circuit ground terminal, and a first transistor third terminal attached to a first digital control signal;
    wherein the second switch is a second transistor having a second transistor first terminal connected to the first terminal of the current source, a second transistor second terminal attached to the load terminal, and a second transistor third terminal attached to a second digital control signal;
    wherein the third switch is a third transistor having a third transistor first terminal connected to the circuit ground terminal, a third transistor second terminal attached to the second terminal of the current source, and a third transistor third terminal attached to a third digital control signal;
    wherein the fourth switch is a fourth transistor having a fourth transistor first terminal connected to the load terminal, a fourth transistor second terminal attached to the second terminal of the current source, and a fourth transistor third terminal attached to a fourth digital control signal.

4. A circuit for generating a high voltage alternating current to drive a load in accordance with claim 1 wherein the first switch, the second switch, the third switch and the fourth switch open and close to alternately connect the current source in series with the load with one of two polarities.

5. A circuit for generating a high voltage alternating current to drive a load in accordance with claim 1 wherein the second switch and the third switch closes to charge the load in a first polarity and the first switch and the fourth switch closes to charge the load in a second polarity.

6. A circuit for generating a high voltage alternating current to drive a load in accordance with claim 1 wherein the current source has an output resistance.

7. A circuit for generating a high voltage alternating current to drive a load in accordance with claim 1 wherein the first switch, the second switch, the third switch and the fourth switch are MOSFET devices.

8. A circuit for generating a high voltage alternating current to drive a load in accordance with claim 1 wherein the charge pump comprises:
 a plurality of diodes coupled in series;
 a plurality of capacitive elements wherein one capacitive element is coupled to an output of each of the plurality of diodes; and
 a pair of voltage sources coupled to the plurality of capacitive elements wherein the pair of voltage sources have voltage signals of opposite phases.

9. A circuit for generating a high voltage alternating current to drive a load in accordance with claim 1 wherein the charge pump comprises:
 a first voltage source;
 a second voltage source, wherein the second voltage sources is approximately 180 degrees out of phase with the first voltage source;
 a plurality of diodes coupled in series;
 a first capacitor coupled to an output of a first diode and to ground;
 a second capacitor coupled to an output of a second diode and to the first voltage source;
 a third capacitor coupled to an output of a third diode and to the second voltage source;
 a fourth capacitor coupled to an output of a fourth diode and to the first voltage source;
 a fifth capacitor coupled to an output of a fifth diode and to the second voltage source; and
 a sixth capacitor coupled to an input of the fifth capacitor and to ground.

10. A circuit for generating a high voltage alternating current to drive a load in accordance with claim 9, wherein the first capacitor and the sixth capacitor are bypass capacitors to reduce a voltage ripple across the load.

11. A circuit for generating a high voltage alternating current to drive a load in accordance with claim 1 wherein the circuit is fabricated on a single semiconductor die.

12. A circuit for generating a high voltage alternating current to drive a load comprising:
 a current source having a first terminal and a second terminal;
 an output terminal;
 a circuit ground terminal;
 a first shaping capacitor attached to the first terminal of the current source and to the circuit ground terminal to reduce frequency fluctuations from the first terminal of the current source;
 a second shaping capacitor attached to the second terminal of the current source and to the circuit ground terminal to reduce frequency fluctuations from the second terminal of the current source;
 a first switch wherein a first switch first terminal is connected to the first terminal of the current source and a first switch second terminal is attached to the circuit ground terminal, the first switch conducting between the first terminal of the current source and the circuit ground terminal when the first switch is closed;
 a second switch wherein a second switch first terminal is connected to the first terminal of the current source and a second switch second terminal is attached to the load terminal, the second switch conducting between the first terminal of the current source and the output terminal when the second switch is closed;
 a third switch wherein a third switch first terminal is connected to the circuit ground terminal and a third switch second terminal is attached to the second terminal of the current source, the third switch conducting between the second terminal of the current source and the circuit ground terminal when the third switch is closed;
 a fourth switch wherein a fourth switch first terminal is connected to the load terminal and a fourth switch second terminal is attached to the second terminal of the current source, the fourth switch conducting between the second terminal of the current source and the output terminal when the fourth switch is closed;
 a load coupled to the output terminal and the circuit ground terminal;
 wherein the first switch, the second switch, the third switch and the fourth switch open and close to alternately connect the current source in series with the load with one of two polarities, the second switch and the third switch closing to charge the load in a first polarity and the first switch and the fourth switch closing to charge the load in a second polarity;
 wherein both the first terminal and the second terminal of the current source float to interchange which of the first terminal and the second terminal of the current source is grounded to the load;
 wherein the current source is a capacitive charge pump providing an approximately constant current output across variable load voltages;
 wherein a minimum terminal count of the circuit is 3.

13. A circuit for generating a high voltage alternating current to drive a load in accordance with claim 12 wherein the load is an electroluminescent lamp.

14. A circuit for generating a high voltage alternating current to drive a load in accordance with claim 12 wherein the first switch is a first transistor having a first transistor first terminal connected to the first terminal of the current source, a first transistor second terminal attached to the circuit ground terminal, and a first transistor third terminal attached to a first digital control signal;
 wherein the second switch is a second transistor having a second transistor first terminal connected to the first terminal of the current source, a second transistor second terminal attached to the load terminal, and a second transistor third terminal attached to a second digital control signal;
 wherein the third switch is a third transistor having a third transistor first terminal connected to the circuit ground terminal, a third transistor second terminal attached to the second terminal of the current source, and a third transistor third terminal attached to a third digital control signal;

wherein the fourth switch is a fourth transistor having a fourth transistor first terminal connected to the load terminal, a fourth transistor second terminal attached to the second terminal of the current source, and a fourth transistor third terminal attached to a fourth digital control signal.

15. A circuit for generating a high voltage alternating current to drive a load in accordance with claim 12 wherein the first switch, the second switch, the third switch and the fourth switch are MOSFET devices.

16. A circuit for generating a high voltage alternating current to drive a load in accordance with claim 12 wherein the current source is a capacitive charge pump.

17. A circuit for generating a high voltage alternating current to drive a load in accordance with claim 16 wherein the capacitive charge pump comprises:

a plurality of diodes coupled in series;

a plurality of capacitive elements wherein one capacitive element is coupled to an output of each of the plurality of diodes; and a pair of voltage sources coupled to the plurality of capacitive elements wherein the pair of voltage sources have voltage signals of opposite phases.

18. A circuit for generating a high voltage alternating current to drive a load in accordance with claim 16 wherein the capacitive charge pump comprises:

a first voltage source;

a second voltage source, wherein the second voltage sources is approximately 180 degrees out of phase with the first voltage source;

a plurality of diodes coupled in series;

a first capacitor coupled to an output of a first diode and to ground;

a second capacitor coupled to an output of a second diode and to the first voltage source;

a third capacitor coupled to an output of a third diode and to the second voltage source;

a fourth capacitor coupled to an output of a fourth diode and to the first voltage source;

a fifth capacitor coupled to an output of a fifth diode and to the second voltage source; and a sixth capacitor coupled to an input of the fifth capacitor and to ground.

19. A circuit for generating a high voltage alternating current to drive a load in accordance with claim 18 wherein the first capacitor and the sixth capacitor are bypass capacitors to reduce a voltage ripple across the load.

\* \* \* \* \*